United States Patent [19]
Sizer, II

[11] Patent Number: 5,663,766
[45] Date of Patent: Sep. 2, 1997

[54] DIGITAL DATA ENCODING IN VIDEO SIGNALS USING DATA MODULATED CARRIER SIGNALS AT NON-PEAKS IN VIDEO SPECTRA

[75] Inventor: Theodore Sizer, II, Little Silver, N.J.

[73] Assignee: Lucent Technologies Inc., Murray Hill, N.J.

[21] Appl. No.: 599,500

[22] Filed: Jan. 25, 1996

Related U.S. Application Data

[63] Continuation of Ser. No. 332,226, Oct. 31, 1994, abandoned.
[51] Int. Cl.⁶ ................................................ H04N 7/08
[52] U.S. Cl. .......................... 348/473; 348/475; 348/553
[58] Field of Search ................................. 348/473, 475, 348/486, 476, 598, 553, 563, 564; H04N 7/08

[56] References Cited

U.S. PATENT DOCUMENTS

| | | | |
|---|---|---|---|
| 4,368,486 | 1/1983 | Degoulet et al. | 348/598 |
| 4,807,031 | 2/1989 | Broughton et al. | 358/142 |
| 4,969,041 | 11/1990 | O'Grady et al. | 348/473 |
| 5,200,822 | 4/1993 | Bronfin et al. | 348/473 |
| 5,243,423 | 9/1993 | DeJean et al. | 348/473 |

*Primary Examiner*—Victor R. Kostak

[57] ABSTRACT

Digital information is encoded in the video portion of a television signal such that "n" (n is an integer) bits of the digital information are carried by each successive frame in a group of frames. The digital information is encoded by modulating a carrier signal, using, for example, either amplitude shift keying (ASK) or frequency shift keying (FSK), and the modulated carrier is then added to the video signal selectively, only in portions of the television program that (a) are not likely to be perceptible by a viewer, and (b) are of sufficient intensity to transmit the data. The video signal including the encoded digital data, may be transmitted, in real time, to a television receiver, or recorded for later playback. In either event, at a receiver, when the video signal containing the encoded information is displayed on a screen, the image is sensed or "viewed" by a photo detector, the output of which is applied to a band pass filter having a center frequency that corresponds to the oscillator frequency (s) in the encoder. The filter output is thresholded or FM detected, so that the receiver can recover the encoded data. By appropriately including checks bits and synchronization patterns, the bit stream output from the decoder can be synchronized, and the original encoded data recovered. Advantageously, the frequency of the oscillator in the ASK or FSK encoder is chosen so that the energy added to the video signal is in a portion of the frequency spectrum that otherwise contains little energy. This makes the added digital data imperceptible to a viewer. If desired, the same data may be repetitively encoded in several groups of frames, so as to increase the redundancy and thus the reliability of the overall system.

11 Claims, 3 Drawing Sheets

DIGITAL DATA ENCODING IN VIDEO SIGNALS USING DATA MODULATED CARRIER SIGNALS AT NON-PEAKS IN VIDEO SPECTRA

This application is a continuation of application Ser. No. 08/332,226, filed on Oct. 31, 1994, abandoned.

FIELD OF THE INVENTION

This invention relates to a system and method for encoding digital information in a television signal, and, more particularly, to encoding in a manner such that encoded information is generally imperceptible in the television display yet the encoded information can be retrieved and decoded by a receiver that simply "watches" or "looks at" the television display.

BACKGROUND OF THE INVENTION

In U.S. Pat. No. 4,807,031 issued to Broughton et al. on Feb. 21, 1989, subliminal encoding of digital information in a television signal is described. Like the present invention, in the patentee's arrangement, the encoded information can then be recovered in a receiver that is not connected to the television on which the television signal is displayed, but rather that "sees" the television image and captures the information. Once captured, the information is later be used to control the activities of a device that is part of and attached to the receiver, such as a toy.

The Broughton arrangement has several difficulties. As an example, subliminal encoding is accomplished by selectively increasing the intensity of one of each pair of adjacent scan lines in each frame of the video image. For example, if, in one frame, adjacent scan lines are of unequal intensity, this may signify an encoded "1", while if the adjacent scan lines have the same intensity, this may signify a "0". The problem with this approach is that the encoded information causes changes in the frequency domain representation of the video portion of the television signal, which occur at one-half of the line rate. Since there is a strong signal present at this frequency even without data present, this makes the encoded information difficult to capture in the receiver.

SUMMARY OF THE INVENTION

The present invention avoids the aforementioned problems by encoding digital information in the video portion of a television signal such that "n" (n is an integer) bits of the digital information are carried by each successive frame in a group of frames. The digital information is encoded by modulating a carrier signal or tone, using, for example, amplitude shift keying (ASK) or frequency shift keying (FSK), and the modulated carrier is then added to the video signal selectively, only in portions of the television program that (a) are not likely to be perceptible by a viewer, and (b) are of sufficient intensity to transmit the data.

In a first embodiment using ASK encoding, digital information to be encoded is stored in a buffer. "n" bits of stored data are read out from the buffer during each frame interval, in synchronization with the video signal frame rate, and control the state of an ASK encoder. The output of the encoder, which is an ASK signal representing the digital information, is combined with the intensity or luminance component of the video signal in a mixer. Advantageously, the frequency of the oscillator in the ASK encoder is chosen so that the energy added to the video signal is in a portion of the frequency spectrum that otherwise contains little energy. This makes the added digital information imperceptible to a viewer. After all information in the buffer has been read out and encoded within one group of frames, the encoding process for the information or message may be repeated using one or more additional groups of frames, so as to increase the redundancy and thus the reliability of the overall system. This is especially useful where the digital information is closely associated with the content of the video signal program, such as being ordering information for products or service being advertised in a television commercial.

The video display created by combining "n" bits of ASK encoded information in one frame interval of a video signal, although imperceptible to an ordinary viewer, can be characterized as creating corresponding horizontal stripes or "portions" in each frame. The state of each of the "n" bits "adjusts" the amplitude of the video signal in a respective one of the stripes or portions in a way that can later be detected, so that the original data can be recovered.

The video signal including the ASK encoded digital data, may be transmitted, in real time, to a television receiver, or recorded, such as by using a video cassette recorder, for later playback. In either event, at a receiver or television, when the video signal containing the encoded information is displayed on a screen, the image is "viewed" or sensed by a photo detector, the output of which is applied to a band pass filter having a center frequency that is the same as the oscillator frequency. The filter output is thresholded, so that the receiver can discriminate, in each portion of each frame, whether or not a component at the oscillator frequency was added to the video signal. By appropriately including checks bits and synchronization patterns, the bit stream output from the thresholder can be synchronized, and the original encoded data recovered.

In the FSK embodiment of the present invention, "n" bits of data are encoded in each frame interval, in an FSK encoder, which generates first or second different frequencies, depending upon whether the data is a 1 or a 0. At the appropriate time, the output of the FSK encoder is added to the video signal, so that the result is again imperceptible to a viewer. At the receiver, an FM detector is used instead of thresholding in order to recover the encoded data.

BRIEF DESCRIPTION OF THE DRAWING

The present invention will be more fully appreciated by consideration of the following detailed description, which should be read in light of the accompanying drawing in which.

DETAILED DESCRIPTION

Figure 1:
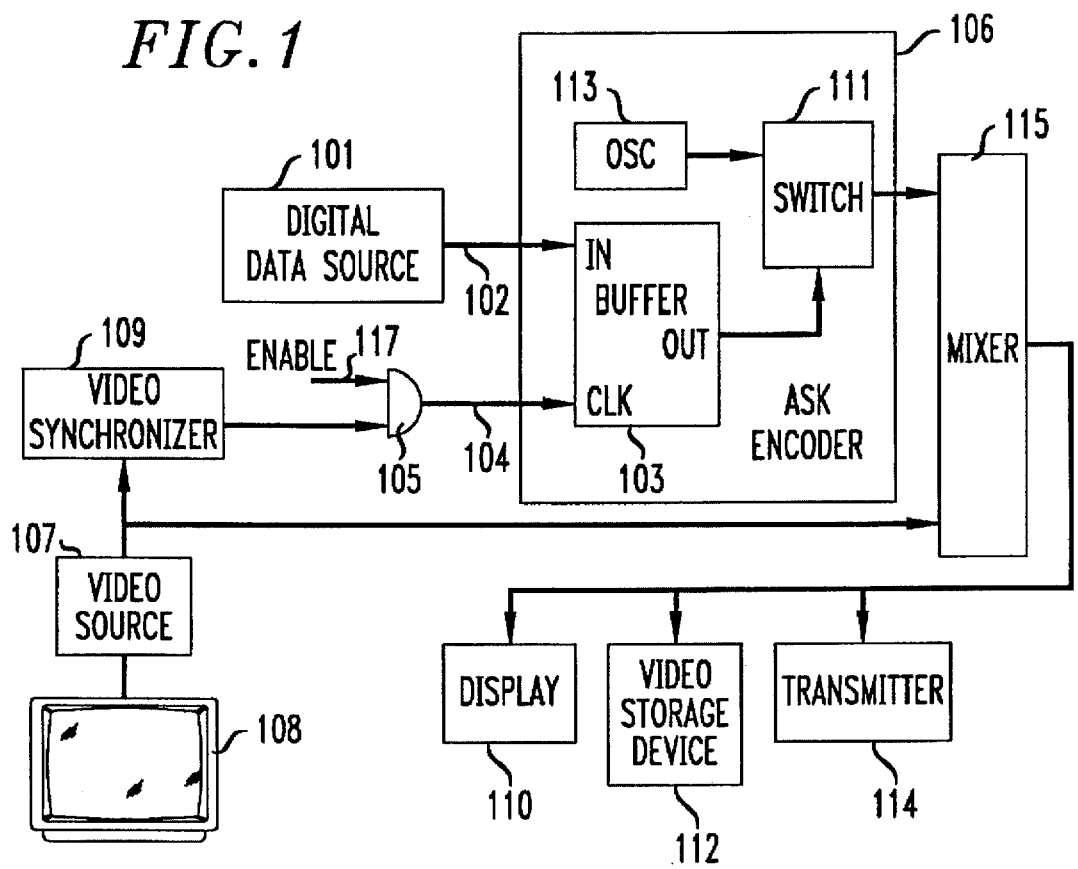
FIG. 1 is a block diagram of an encoder arranged in accordance with the principles of the present invention, to add ASK encoded data to a video signal.

Referring first to FIG. 1, there is shown a block diagram of an encoder arranged in accordance with the principles of the present invention, to add ASK encoded data to a video signal. The encoded data to be added to the video signal is generated by a digital data source 101, which can be a computer or other device which encodes text, numerical information, or other information as a digital bit stream in such a manner that the intelligence can be recovered in a decoder to which the same bit stream is applied. The output from data source 101 is applied to the data input 102 of a first-in, first-out buffer 103, which is part of an ASK encoder 106, and held in buffer 103 until a clock signal is applied to the buffer on line 104. In this embodiment, it is assumed that one bit of ASK encoded data is added to each successive frame of a video signal. It is to be understood, however, that as explained below, n bits of information can be added to each frame with a small modification to the arrangement of FIG. 1.

A video source 107 generates the video signal to which the ASK encoded data is to be added. To assure that the ASK signal is superimposed at an opportune time with respect to the content of the video program, such that the effect of the added signal is minimally discernible, the output of video source 107 is applied to a video display device 108, which may be a standard television or monitor. At the opportune time, such as when the television program is of sufficient intensity to transmit the data and when the scene does not contain any pattern that would generate a frequency component that is close to, and thus could interfere with, the frequency of the ASK signal to be added to the video signal, an enable signal is applied to one input 117 of AND gate 105. The second input to gate 105 is derived from the output of a video synchronizer 109, to which the video signal from video source 107 is also applied.

Video synchronizer 109 is arranged to produce output pulses that are synchronized with, and that occur in timed relation with, each frame of the video signal output from video source 107. As long as the enable signal on line 117 is high, these synchronization pulses (generally at 60 Hz) are passed through gate 105 and applied to the clock input of buffer 103 on line 104. This causes the information in buffer 103 to be read out, one bit per frame and in synchronization with the frame, and applied to the control input of a switch 111. Switch 111 may be a flip-flop or other similar element, arranged to be closed when a "1" is output from buffer 103 and to be open when a "0" is output from buffer 103.

Oscillator 113 in ASK encoder 106 is arranged to generate a carrier signal or tone at a predetermined frequency (such as 25 kHz) that is generally indiscernible when added to a video image, and apply its output to switch 111. This carrier signal is applied to switch 111, the state of which is controlled by the output from buffer 103. In this way, the output of switch 111 is an ASK encoded version of the digital information from data source 101. The ASK encoded signal output from switch 111 is applied to one input of a mixer 115, the other input of which is obtained from video source 107. Accordingly, the ASK signal is mixed with, or added to, the video signal.

The result of the arrangement illustrated in FIG. 1 is that ASK encoded data from source 101 is added, on a frame by frame basis, to the video signal from video source 107. Synchronization is provided by synchronizer 109, so that the ASK encoded data is added in the same portions of successive frames. The output of mixer 115 may be displayed immediately, on a display device 110, which may be a television, or stored in a video storage device 112 such as a video cassette recorder, for later use, or applied to a transmitter 114 for broadcast to remote receivers. Control is provided by the enable signal on line 117 so that the ASK encoded signal is added to the video signal only in the appropriate portions of the video program. Note here that the amplitude of the video signal corresponds to the luminance or intensity component, while the phase of the video signal corresponds to the chrominance component. Accordingly, the present invention is desirably arranged to modulate only the amplitude of the video signal.

The encoding process for particular digital information is completed when all of the data in buffer 103 has been read out. If desired, the encoding process for the same data may then be repeated, using an additional group or series of frames. Repetition may be desirable in order to increase the redundancy and thus the reliability of the overall system. Typically, digital information for a particular message, which may correspond to an advertisement or television commercial, may consist of several hundred bytes of information, containing a few thousand bits of information. If n=5, and the frame rate is 60 frames per second, 2,000 bits could be encoded in about 6 to 7 seconds of a video signal. The same message could therefore be repeated about 5 times during the course of a 30 second commercial.

Figure 2:
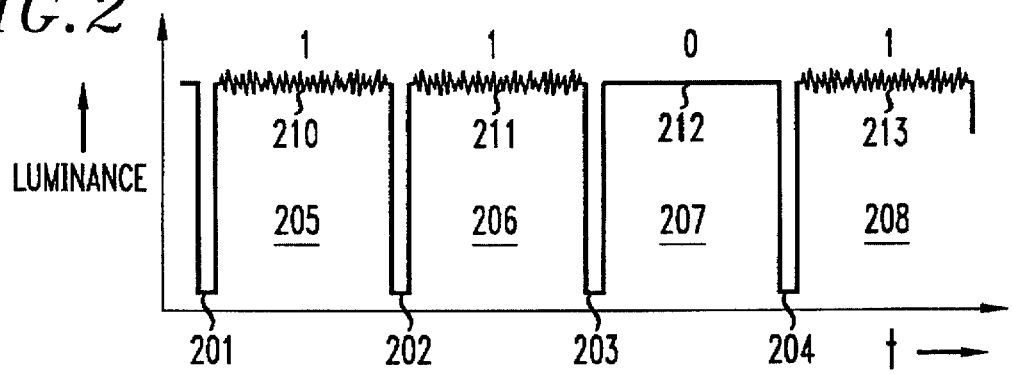
FIG. 2 is a diagram illustrating the wave form of the video signal, in the time domain, with one bit of ASK encoded information added to a series of successive frames of the video signal.

The time domain wave form of the luminance portion of the video signal (i.e., with ASK encoded information added) is shown in FIG. 2. Synchronization pulses divide the signal into a series of successive frames, which are characterized by vertical blanking intervals 201–204 which separate the information bearing portions of each frame 205–208. This diagram is greatly exaggerated for the purpose of illustration, it being understood that luminance variation is what carries much of the pictorial information conveyed by a video signal.

In the illustration of FIG. 2, it is assumed that the content of buffer 103 was the digital sequence 1-1-0-1. Accordingly, when the enable signal on line 117 goes high, the same sequence, 1-1-0-1 is read out of buffer 103, one bit at a time, at the frame rate. During frame 205, the output of ASK encoder 106 is high, since the output of oscillator 113 may pass through switch 111 when the control input of that switch is high. Accordingly, the luminance signal, during that frame interval, is combined with a tone, as indicated by the "oscillations" indicated at 210. Likewise, in frame 206, the second bit is also a "1", and a high ASK encoder output is again combined with the luminance signal. Next, in frame 207, the third bit is a "0". In this case, switch 111 is open due to the low control applied from buffer 103. During this frame interval, the output of ASK encoder 106 is low, and therefore luminance signal is unchanged from its original state (as generated in video source 107) and appears relatively flat in FIG. 2 as indicated at 212. Finally, in frame 213, another "1" bit is represented in the same manner as in frames 205 and 206.

Figure 3:
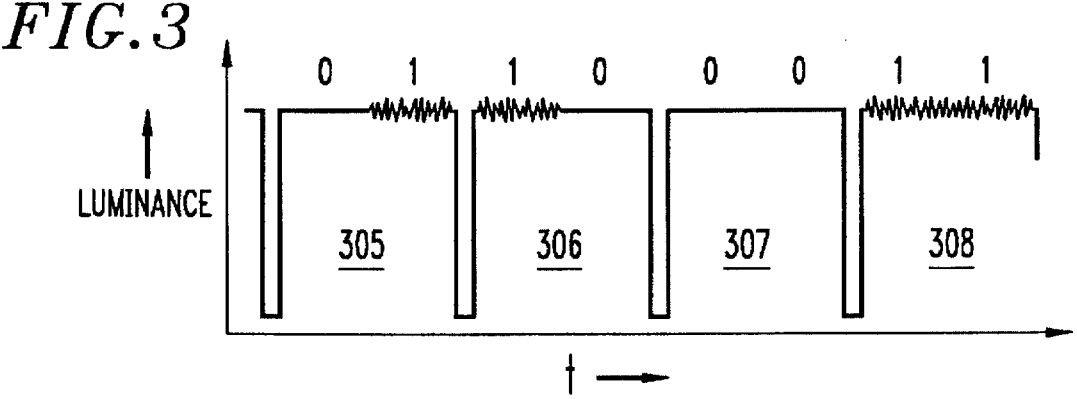
FIG. 3 is a diagram similar to FIG. 2, but illustrating the wave form when n=2, so that two ASK encoded bits are added to each successive video frame.

In order to ASK encode multiple (i.e. an integer "n") bits in each of several successive frame intervals, the arrangement of FIG. 1 may be modified by applying the output of AND gate 105 to a timing circuit arranged to produce "n" clock pulses during each frame interval. This may be accomplished using a simple counter which outputs a string of "n" timing pulses each time a single input pulse is applied to the counter. With this arrangement, n bits are read out from buffer 103 during each frame interval, and the output of ASK encoder 106 is a multi-bit ASK encoded signal, which is added to each frame of the video signal. This result, for an arrangement in which n=2, is illustrated in FIG. 3, which like FIG. 2, represents the time domain wave form of the luminance portion of the video signal output from mixer 115. In this example, digital sequence of 0-1-1-0-0-0-1-1 is illustrated. In the first frame 305, the amplitude of the video signal during the first ½ of the frame interval is not changed, since the output of ASK encoder 106 is low during that time. The amplitude of the video signal during the second half of the frame interval includes a component at the frequency of oscillator 113, since the output of encoder 106 is high at that time. This sequence therefore corresponds to the first two bits, 0-1, of the digital information being encoded. In the next frame 306, the video signal in the first half of the frame interval includes a component at the frequency of oscillator 113, while the video signal in the second half of the frame interval does not, corresponding to the next two bits, 1-0. The remainder of the figure follows the same pattern, and represents the remaining bits 0-0-1-1.

The foregoing description of an ASK encoder is meant to be rudimentary, and illustrative only of the principles of the present invention. There are numerous ways in which the desired ASK encoding may be obtained, as will be appreciated by those skilled in the art. Furthermore, there are many changes that may be made as a matter of design choice. For example, synchronizer 109 may be synchronized on the beginning of each frame, or alternatively, on any other part of each frame; this, in turn, could be used to control where, within each frame of the video image, the digital data was inserted. Furthermore, the full width of each frame of the video signal need not be used, as shown in FIGS. 2 and 3. Rather, using FIG. 3 as an example, the digital data can be read out of buffer 103 in such a manner that, for each frame, a guard band is provided, for example, in the first, last and middle portions of each frame. If this were done, the first bit of digital data would be used to modulate only the portion of the frame between the first and middle guard band, and the second bit would be used to modulate only the portion of the frame between the middle and final guard band. Pictorially, this arrangement would translate to horizontal stripes in the video image which would contain the ASK encoded digital data.

Figure 4:
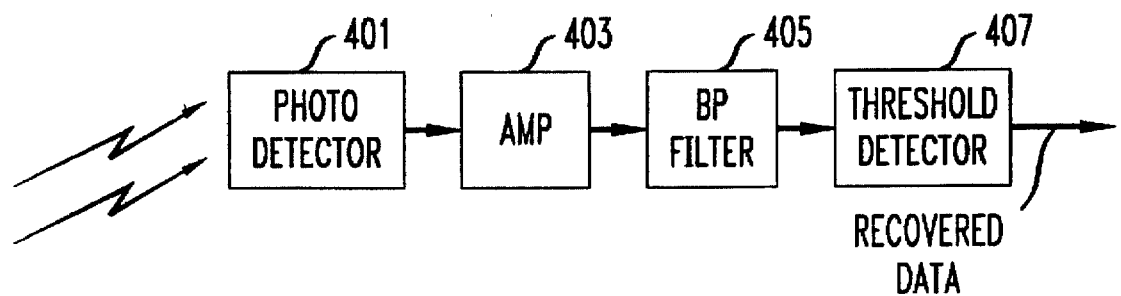
FIG. 4 is a block diagram of a receiver/decoder arranged in accordance with the principles of the present invention, to recover the ASK encoded data from the video signal.

A video signal encoded using the encoder arrangement of FIG. 1 can be transmitted via over the air broadcast using transmitter 114, cable TV facilities, or by other means, and be displayed in real time on remote terminals, such as a television or similar display device. Alternatively, the video signal may displayed on a local display 110 or be recorded, such as by using a video cassette recorder (VCR) or other video storage device 112, so that the video program may be displayed on a time-delay basis. In either event, FIG. 4 is a block diagram of a receiver/decoder arranged in accordance with the principles of the present invention, to recover the ASK encoded data from the video signal generated by the encoder of FIG. 1, when the video signal is displayed on a display device. Data recovery and decoding occurs by simply sensing or "watching" the video display containing a picture to which digital information has been added. This is done by "pointing" a photo detector 401 at a video display screen to which the video output signal from the encoder of FIG. 1 has been applied, so that light emanating from the display impinges upon the photo detector for a sufficient period of time such that all of the group or sequence of frames containing the encoded information are displayed.

The output signal generated by photo detector 401 is amplified in an amplifier 403 and applied to a band pass filter 405 tuned to the frequency of oscillator 113 in the encoder of FIG. 1. The output of band pass filter 405 is applied to a threshold detector 407 that is adjusted to detect the difference in signal strength between frames containing energy at the frequency of oscillator 113 and frames that do not contain such energy. In one typical arrangement, amplifier 403 had a gain of 60 dB, filter 405 had a pass band of 1 kHz, and detector 407 was implemented using a diode detector.

Figure 5:
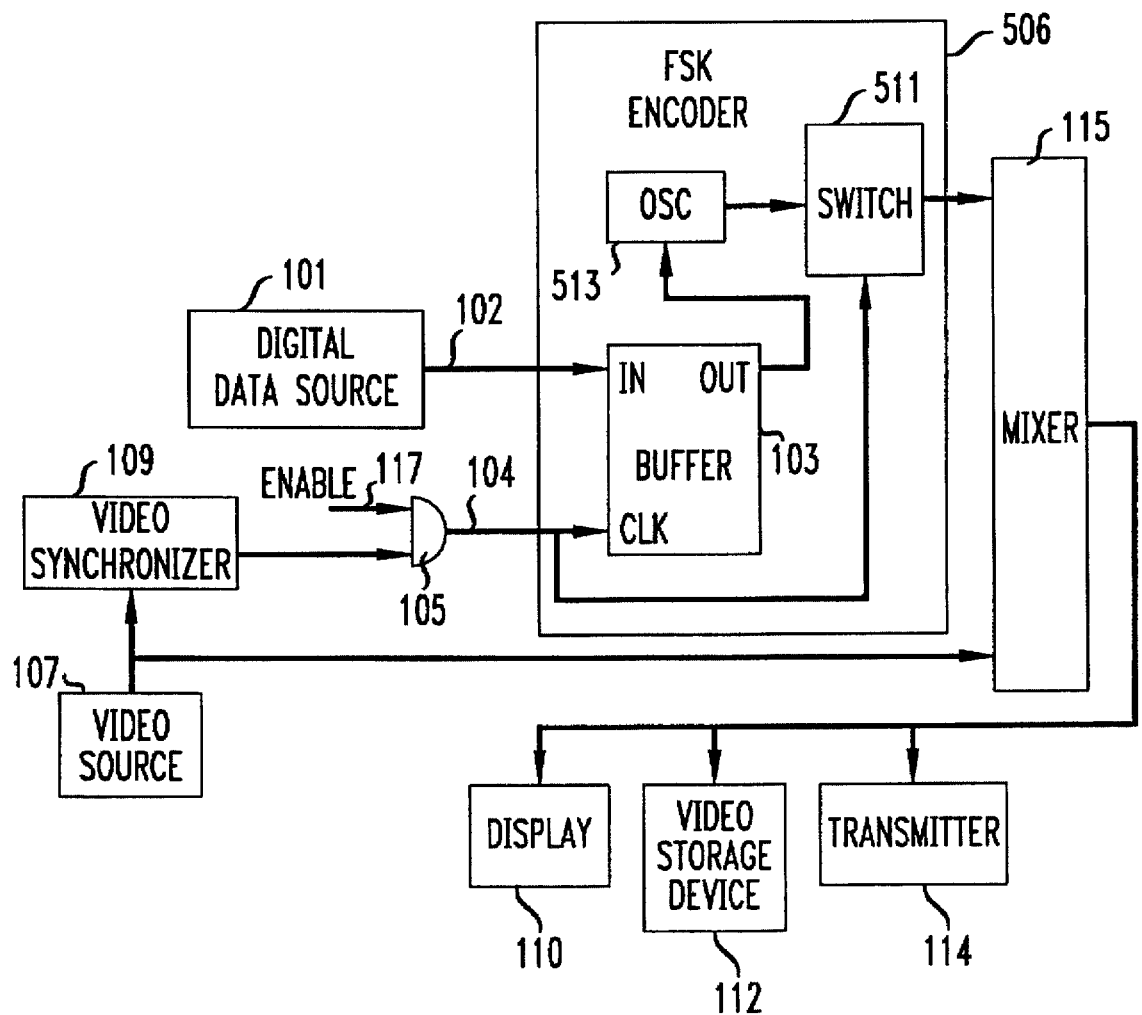
FIGS. 5, 6 and 7 are diagrams similar to FIGS. 1, 3 and 4, respectively, but showing the use of FSK encoding and decoding, rather than ASK.
Figure 6:
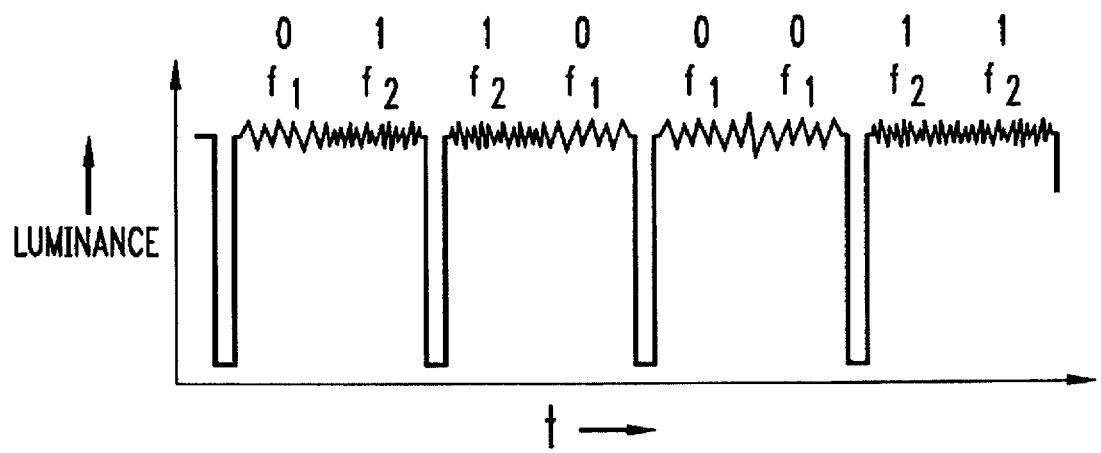
Figure 7:
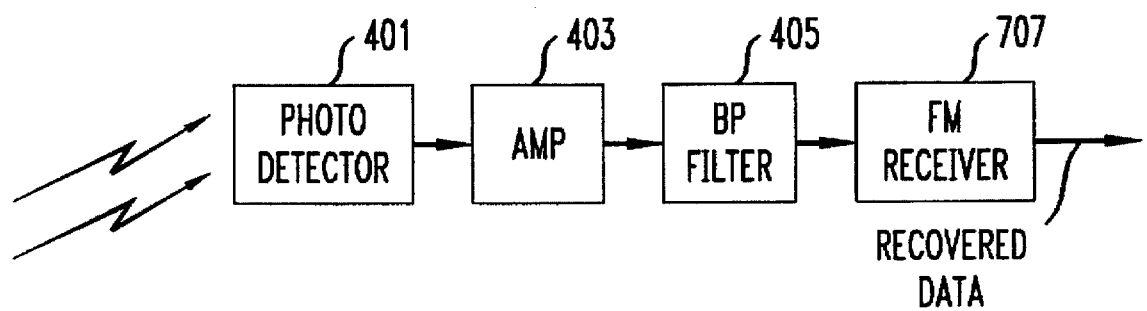

FIGS. 5, 6 and 7 are diagrams similar to FIGS. 1, 3 and 4, respectively, but illustrate the use of an FSK encoder rather than an ASK encoder. For convenience, the same reference designations have been included for components performing similar functions, and only the differences from the previously described figures will be discussed.

In FIG. 5, oscillator 513 in FSK encoder 506 is arranged to output first or second different output frequencies $f_1$ and $f_2$, depending upon the value, i.e., "1" or "0" of the digital data output from buffer 103. As before, synchronization is obtained from synchronizer 109, and used to clock data from buffer 103 that is used to control the output of oscillator 513. Switch 511 receives a control input from AND gate 105, and therefore allows the output of oscillator 513 to pass to mixer 115 for combination with the video signal from video source 107, only when the output from AND gate 105 is high. In this way, as shown in FIG. 6, the FSK signal output from switch 511 is combined with the video signal such that during at least a portion of each frame, a component at frequency $f_1$ or a component at frequency $f_2$ (depending upon the digital data in the buffer) is added to the video signal. If multiple bits are to be encoded in each frame interval, FSK encoder 506 may be arranged to generate an output with more than two frequencies. In the receiver/decoder shown in FIG. 7, threshold detector 407 is replaced by an FM receiver 707 that is arranged to discriminate between the two (or more) FSK frequencies generated by oscillator 513 that were added to the video signal, thereby recovering the digital data.

Persons skilled in the art will appreciate that various modifications and adaptation of the present invention will be possible, and accordingly, the invention should be limited only by the appended claims. For example, a phase shift keyed (PSK) encoder could also be employed to incorporate digital information within the video signal. In such an arrangement, a PSK decoder would be used in the corresponding receiver.

I claim:

1. A system for communicating digital information in a video signal, said video signal having a spectrum associated therewith, comprising:

an encoder arranged to add a carrier signal modulated by digital information to said video signal, said modulated carrier signal at other than a frequency corresponding to a peak in the video spectrum, and a receiver arranged to optically sense said video signal and to recover said encoded digital information in said video signal.

2. The invention defined in claim 1 wherein said carrier signal is modulated using amplitude shift keying (ASK), frequency shift keying (FSK), or phase shift keying (PSK).

3. The invention defined in claim 1 wherein said carrier signal containing said digital information is added to said video signal such that said digital information is not likely to be perceptible by a viewer.

4. An encoder arranged to encode n bits of digital information in each successive frame of a video signal, said video signal having a spectrum associated therewith, comprising a buffer for storing said digital information, means for obtaining a synchronization signal synchronized with the frame rate of said video signal, means responsive to said synchronization signal for generating a modulated carrier signal during each frame interval, said modulated carrier signal at other than a frequency corresponding to a peak in the video spectrum, said modulated carrier signal being formed by controlling the output of an oscillator in accordance with the value of the next n bits from said buffer, and means for combining said modulated carrier signal with said video signal.

5. The invention defined in claim 4 wherein the frequency of said oscillator is chosen so that the energy added to said video signal is in a portion of the frequency spectrum that otherwise contains little energy, so that said digital information is not likely to be perceptible by a viewer.

6. A receiver arranged to recover n bits of encoded digital information included in each successive frame of a video signal, said video signal having a spectrum associated therewith, comprising a photo detector responsive to the picture generated by said video signal, means for amplifying the output of said photo detector, means for filtering the output of said amplifying means to isolate a component at a particular frequency, said frequency being other than a frequency corresponding to a peak in the video spectrum, and means for applying the output of said filtering means to a decoder to recover said encoded digital information.

7. A receiver, including a photo detector for viewing a television signal display containing encoded information mixed with a video signal, said video signal having a spectrum associated therewith, said encoded information being represented by at least one frequency component at a frequency which is not likely to be perceptible to a viewer of said video signal, said frequency being other than a frequency corresponding to a peak in the video spectrum, means including a band pass filter having a center frequency that is the same as said frequency of said frequency component, for isolating said frequency component from the output of said photo detector, and thresholding means for recovering said encoded information from said isolated frequency component.

8. A method for encoding digital information in the video portion of a television signal such that "n" (n is an integer) bits of the digital information are carried by each successive frame in a group of frames, said television signal having a spectrum associated therewith, comprising the steps of encoding said digital information using either amplitude shift keying (ASK) or frequency shift keying (FSK), and selectively adding said encoded digital information to said video signal, only in one or more portions of the spectrum other than those which correspond to a peak in said spectrum, wherein said encoding steps includes the steps of storing digital information to be encoded in a buffer, reading out "n" bits of stored data from the buffer during each frame interval, in synchronization with the video signal frame rate, and using the output from said buffer to control the state of an ASK or FSK encoder.

9. The method defined in claim 8 wherein said ASK or FSK encoder includes an oscillator arranged to generate an output signal having at least one frequency component chosen so that energy added to said video signal is in a portion of the frequency spectrum that otherwise contains little energy.

10. The method defined in claim 8 wherein after all data in said buffer has been read out and encoded within one group of frames, the encoding process for the same data is repeated using at least one additional groups of frames.

11. The method defined in claim 9 further including the steps of recovering said encoded digital data by displaying said video signal containing said encoded information on a screen, capturing the video image on said screen in a photo detector, applying the output of said photo detector to a band pass filter having a center frequency that corresponds to said oscillator frequency, and processing the output of said filter to determine, for each portion of each frame, whether or not a component at said oscillator frequency was added to said video signal.

\* \* \* \* \*